(12) United States Patent
Wang

(10) Patent No.: US 8,455,125 B2
(45) Date of Patent: Jun. 4, 2013

(54) FIXING MECHANISM

(75) Inventor: Wei-Jun Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 572 days.

(21) Appl. No.: 12/641,618

(22) Filed: Dec. 18, 2009

(65) Prior Publication Data

US 2011/0091757 A1 Apr. 21, 2011

(30) Foreign Application Priority Data

Oct. 19, 2009 (CN) .......................... 2009 1 0308468

(51) Int. Cl.
*H01M 2/10* (2006.01)

(52) U.S. Cl.
USPC ............................................ 429/97; 429/100

(58) Field of Classification Search
None
See application file for complete search history.

(56) References Cited

U.S. PATENT DOCUMENTS

| 697,371 | A | 4/1902 | Sindorf | |
|---|---|---|---|---|
| 7,654,859 | B2* | 2/2010 | Cheng | 439/500 |
| 2007/0003825 | A1 | 1/2007 | Touchton et al. | |
| 2009/0233497 | A1* | 9/2009 | Cheng | 439/841 |
| 2010/0285343 | A1* | 11/2010 | Cheng | 429/96 |
| 2011/0064982 | A1* | 3/2011 | Liu | 429/100 |

FOREIGN PATENT DOCUMENTS

| JP | 60-195868 | * 10/1985 |
|---|---|---|
| JP | 01-100999 | * 4/1989 |

* cited by examiner

*Primary Examiner* — Jonathan Crepeau
(74) *Attorney, Agent, or Firm* — Altis Law Group, Inc.

(57) ABSTRACT

A fixing mechanism includes a battery sleeve, a resilient member and a battery cover. The battery sleeve defines an open end to receive a battery. The battery sleeve includes a latching portion formed in an inner surface thereof adjacent to the open end. The resilient member is fixed to the inner side surface of battery sleeve. The battery cover includes a guide portion defined in an outer surface thereof, and a latching portion connecting with the guide portion. The battery cover is rotatably engaged with the battery sleeve via the open end. The latching protrusion slides along the guide portion until the latching protrusion is locked in the latching portion, and the resilient member presses the battery to resist the battery cover.

18 Claims, 8 Drawing Sheets

FIXING MECHANISM

BACKGROUND

1. Technical Field

The present disclosure generally relates to fixing mechanisms and, particularly, to a fixing mechanism for a battery in an electronic device.

2. Description of Related Art

An electronic device, such as a wireless keyboard, a wireless touchpad, a remote control, or other battery operated device often utilizes a battery to provide electrical power. A fixing mechanism for a battery in the electronic device is often utilized to facilitate insertion and removal of the battery.

A typical fixing mechanism includes a battery sleeve and a detachable battery cover. The battery sleeve defines an open end. The sleeve defines a chamber to receive the battery via the open end. The battery cover includes a cover plate and a body portion extending downward from the cover plate. The battery sleeve further defines an inner threading in an inner surface of the chamber adjacent to the open end. The body portion of the battery cover defines an outer threading corresponding to the inner threading, such that the body portion of the battery cover may engage the open end of the battery sleeve. However, this system is relatively inconvenient to use.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
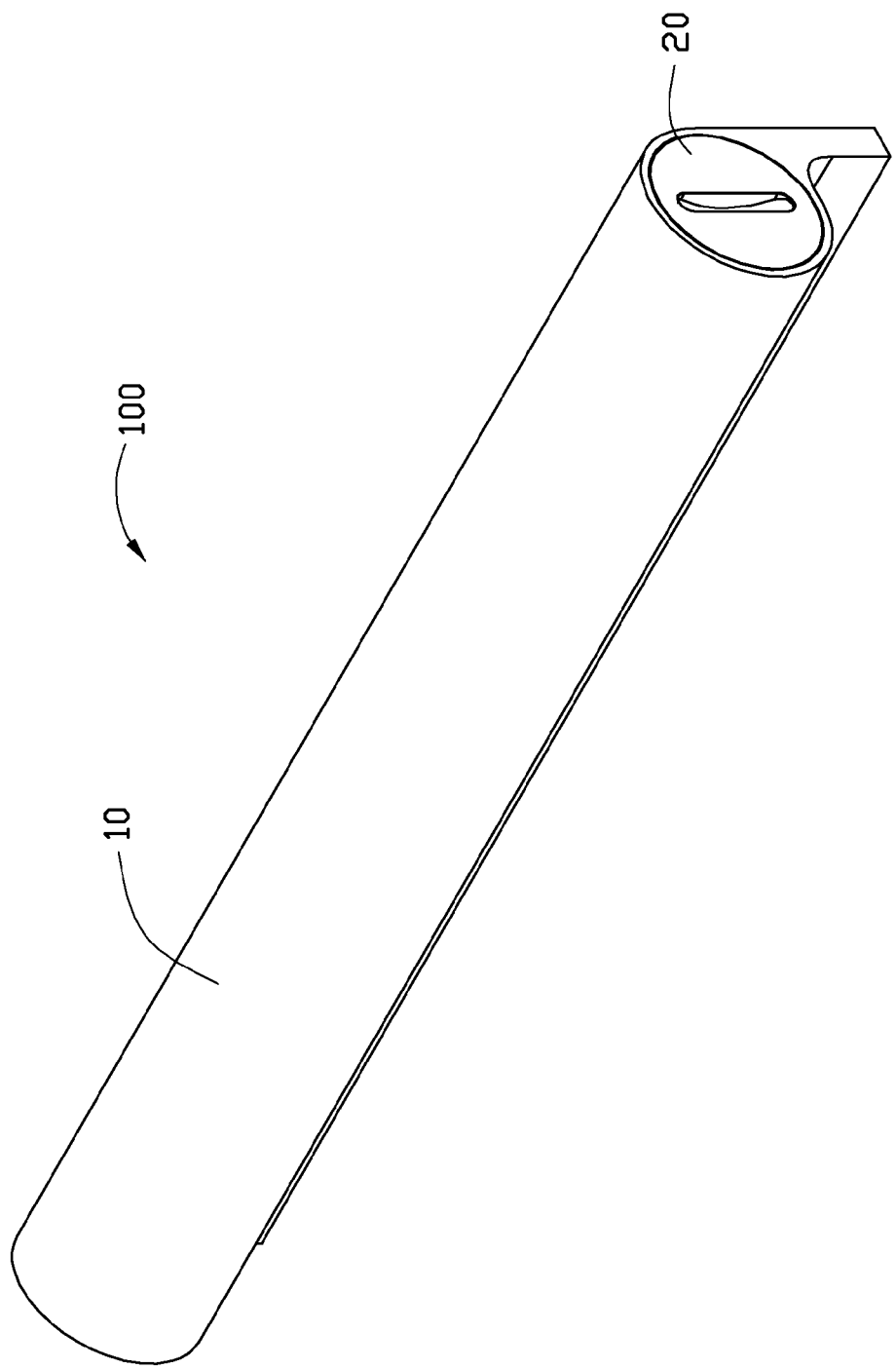
FIG. 1 is an assembled, isometric view of a first embodiment of a fixing mechanism including a battery sleeve, a battery cover, a resilient member, an electrically conductive member, and an insulated protector.
Figure 2:
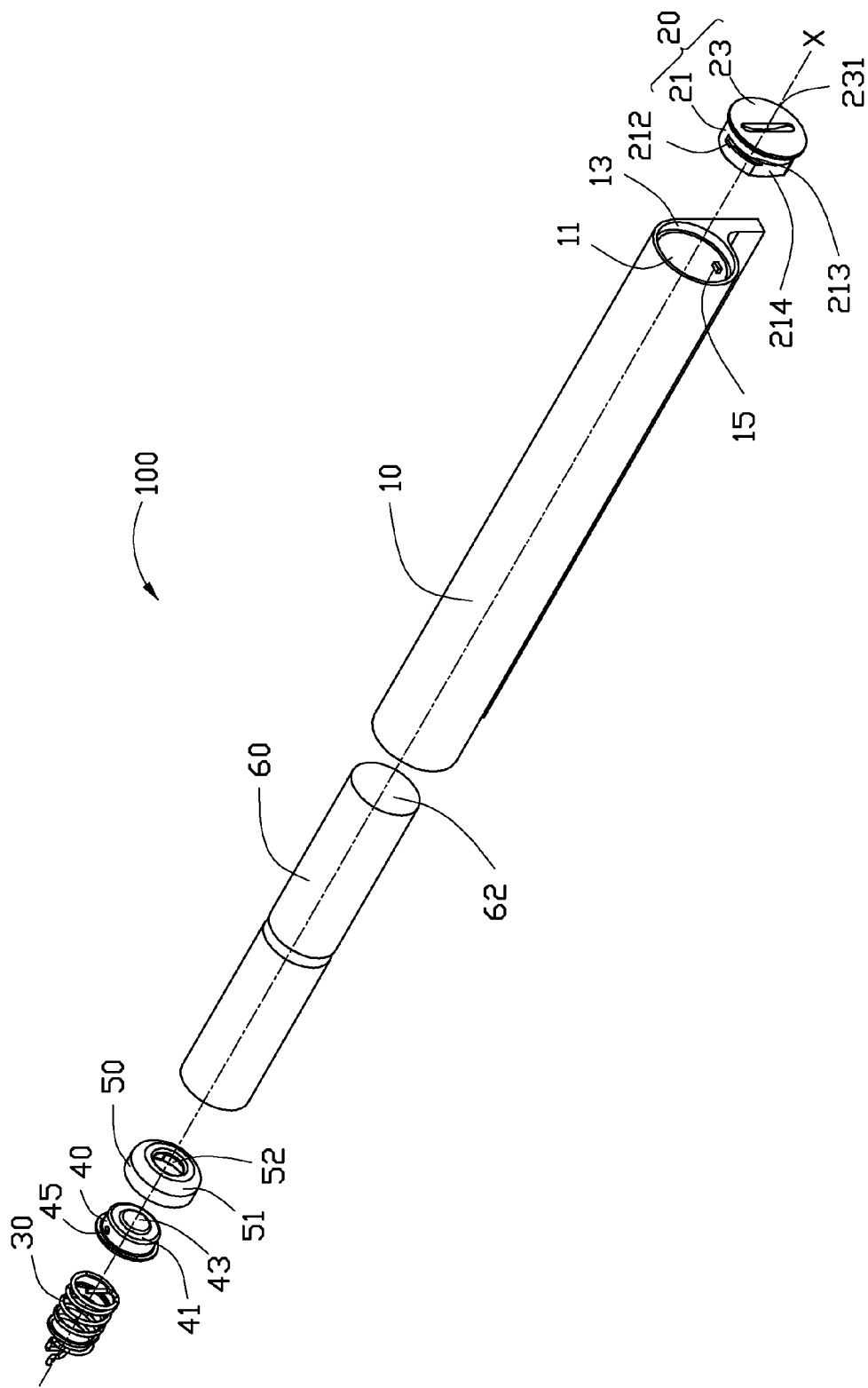
FIG. 2 is an exploded, isometric view of the fixing mechanism of FIG. 1.

Referring to FIGS. 1 and 2, a first embodiment of a fixing mechanism 100 includes a battery sleeve 10, a battery cover 20, a resilient member 30, an electrically conductive member 40 and an insulated protector 50. The battery cover 20 is fixed to the battery sleeve 10. The resilient member 30 is fixed in the battery sleeve 10. The resilient member 30 can be fixed in the battery sleeve 10 by welding. The insulated protector 50 is received in the battery sleeve 10. The electrically conductive member 40 is fixed between the resilient member 30 and the insulated protector 50 in the battery sleeve 10. The fixing mechanism 100 is used to fix batteries 60 in the battery sleeve 10 with the battery cover 20. The fixing mechanism 100 can be employed in an electronic device (not shown), such as a wireless keyboard, a wireless touchpad, or a remote control.

The battery sleeve 10, the battery cover 20, the resilient member 30, the electrically conductive member 40, the insulated protector 50 and the batteries 60 define a common central axis X (see FIG. 2). The battery sleeve 10 can be substantially cylindrical. The battery sleeve 10 defines an open end 11. The battery sleeve 10 is configured to receive the batteries 60 via the open end 11. The battery sleeve 10 further includes a ledge 13 and two latching protrusions 15. The ledge 13 is defined at an inner surface of the battery sleeve 10 adjacent to the open end 11. In the illustrated embodiment, the ledge 13 is a continuous cutout extending along a circumference substantially perpendicular to the central axis X to block the battery cover 20. The two latching portions 15 are formed in the inner surface of the battery sleeve 10 adjacent to the ledge 13 and substantially symmetrical relative to the central axis X.

Figure 3:
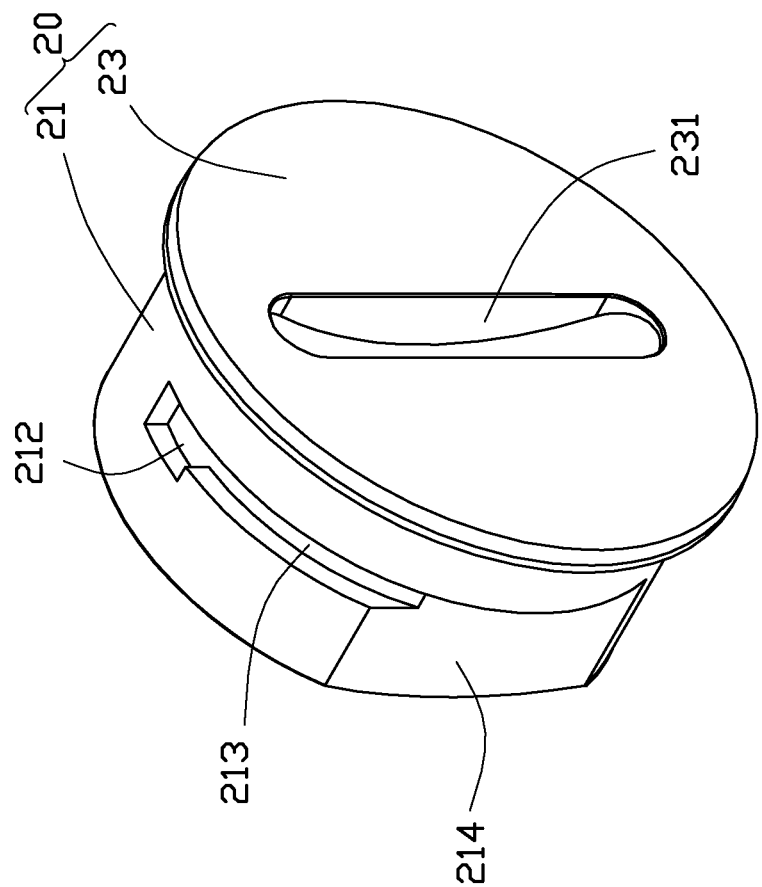
FIG. 3 is an isometric view of the battery cover of the fixing mechanism of FIG. 1.

Referring to FIG. 3, the battery cover 20 includes a body portion 21 and a cover portion 23 formed at an end of the body portion 21. The body portion 21 is substantially cylindrical. The cover portion 23 is a substantially circular plate. A diameter of the cover portion 22 exceeds a diameter of the body portion 21. The battery cover 20 further includes two latching portions 212, and two guide portions 213 and two engaging portions 214 in an outer side surface of the body portion 21. The two latching portions 212 are substantially symmetrical relative to the central axis X. The two guide portions 213 extend along a circumference substantially perpendicular to the central axis X. Each guide portion 213 interconnects one latching portion 212 and one engaging portion 214. The two engaging portions 214 extend along a plane substantially parallel to the central axis X.

In the illustrated embodiment, the latching portion 212 is a groove defined in the outer side surface of the body portion 21. The guide portion 213 is an elongated groove extending along a circumference substantially perpendicular to the central axis X. The engaging portion 214 is a flat planar portion extending substantially parallel to the central axis X. The latching protrusions 15 of the battery sleeve 10 can slide from the engaging portion 214 to the guide portion 213 until engaging in the corresponding latching portions 212.

The battery cover 20 further defines an operating slot 231 in a top surface of the cover portion 23 that can engage with a tool to fix and remove the battery cover 20 to and from the battery sleeve 10. The battery cover 20 can be made of electrically conductive metals.

The resilient member 30 is a spring with one end fixed to an inner surface of the battery sleeve 10. The other end of the resilient member 30 is mounted into the electrically conductive member 40.

Figure 4:
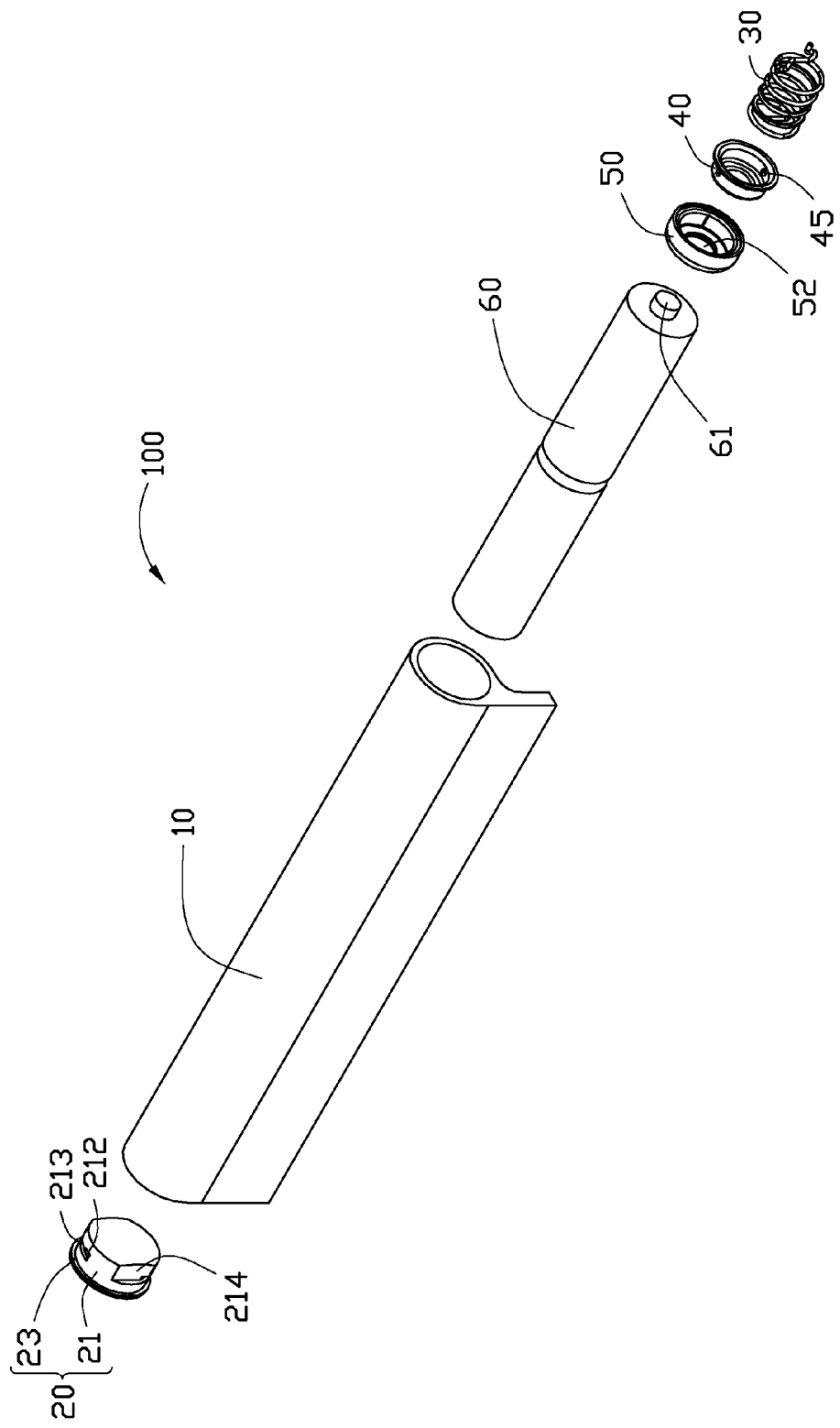
FIG. 4 is similar to FIG. 2, but viewed from another aspect.

Referring to FIGS. 2 and 4, the electrically conductive member 40 may be a cap-shaped structure, which includes a circular base plate 41. The electrically conductive member 40 further includes a contact protrusion 43 and two latching protrusions 45. The contact protrusion 43 protrudes from an outer surface of the base plate 41 to contact the positive electrode 61 of the batteries 60. The latching protrusions 45 are formed at an inner surface of the electrically conductive member 40. The end of the resilient member 30 is mounted with the latching protrusions 45 so as to be fixed to the electrically conductive member 40.

The insulated protector 50 may be cap shaped. The 50 includes a circular base plate 51. The base plate 51 defines a through hole 52 according to a shape of the contact protrusion 43. The electrically conductive member 40 is fixed in the insulated protector 50 by glue.

Figure 5:
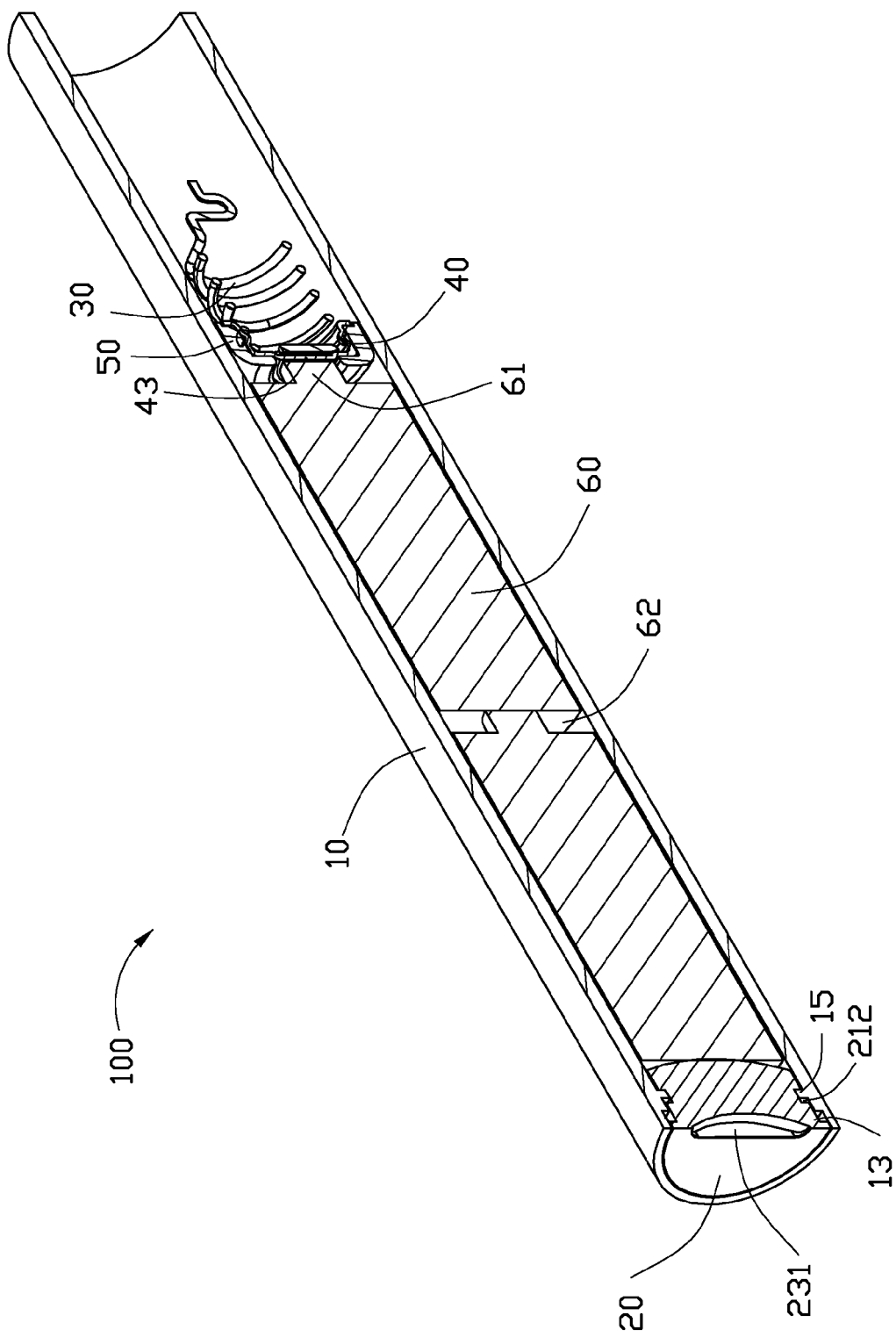
FIG. 5 is a cutaway view of the fixing mechanism of FIG. 1.
Figure 6:
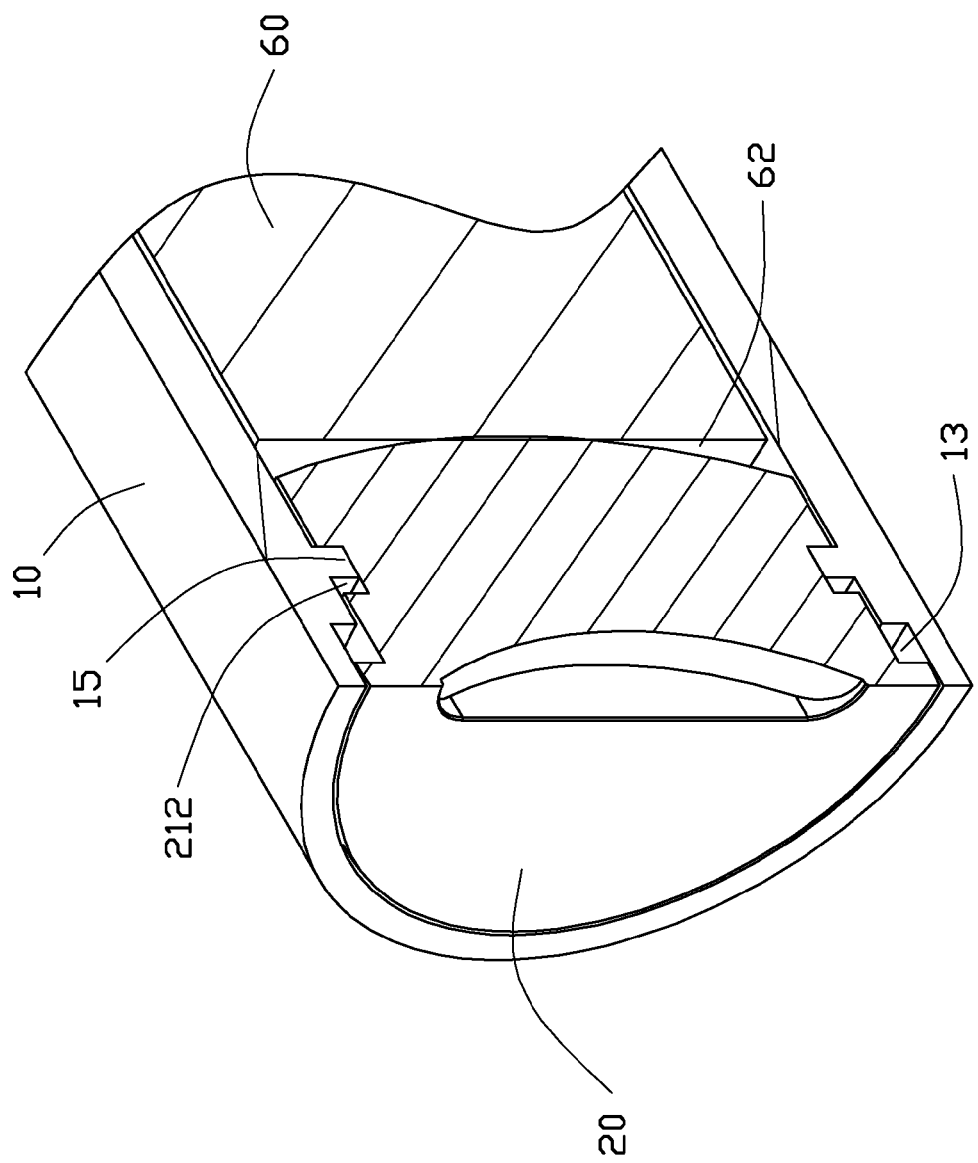
FIG. 6 is an enlarged, partial, cutaway view of an end of the fixing mechanism of FIG. 5.
Figure 7:
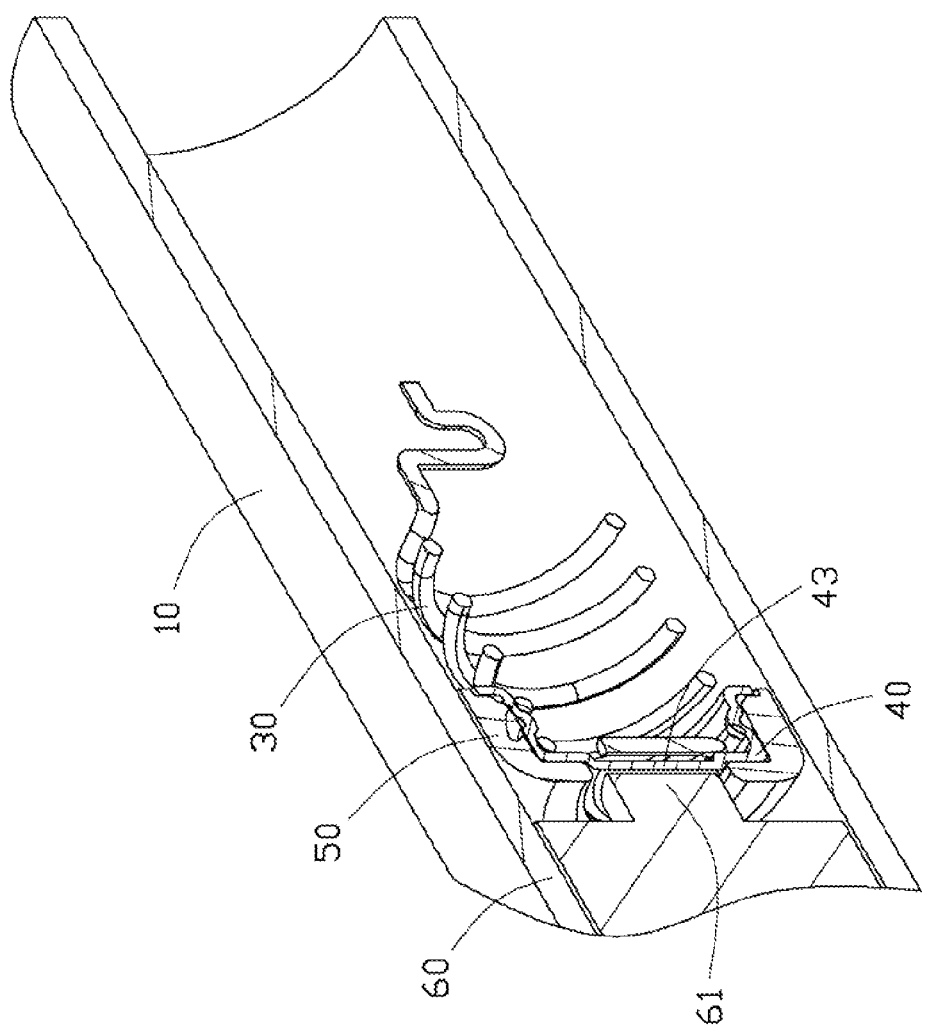
FIG. 7 is an enlarged, partial, cutaway view of the other end of the fixing mechanism of FIG. 5.

Referring to FIGS. 5 through 7, to fix the battery cover 60, the insulated protector 50 is slid in the battery sleeve 10. The resilient member 30 resists the electrically conductive member 40 and impels the electrically conductive member 40 with the insulated protector 50 towards the batteries 60, until the contact protrusions 43 are electrically connected to the positive electrodes 61 of the batteries 60. The battery cover 20 is rotated clockwise, and the latching protrusions 15 of the battery sleeve 10 slide from the engaging portions 214 to the guide portions 213. The resilient member 30 resumes its deformation, such that the latching protrusions 15 are locked in the latching portions 212. Accordingly, the batteries 60 are fixed into the battery sleeve 10.

To remove the battery cover 20 from the battery sleeve 40, the battery cover 20 is first based against the batteries 60, such that the latching protrusion 15 is detached from the latching portion 212. The battery cover 20 is rotated counterclockwise, and the latching protrusions 15 of the battery sleeve 10 slide from the guide portion 213 to the engaging portion 214. The battery cover 20 is freed from the battery sleeve 10.

Both assembly and disassembly of the batteries 60 to and from the fixing mechanism 100 are easily accomplished, and the structure of the fixing mechanism 100 is simplified. In addition, the electrically conductive member 40 is protected by the insulated protector 50 and avoids contacting with the inner surface of the battery sleeve 10, thus avoiding short circuits.

Figure 8:
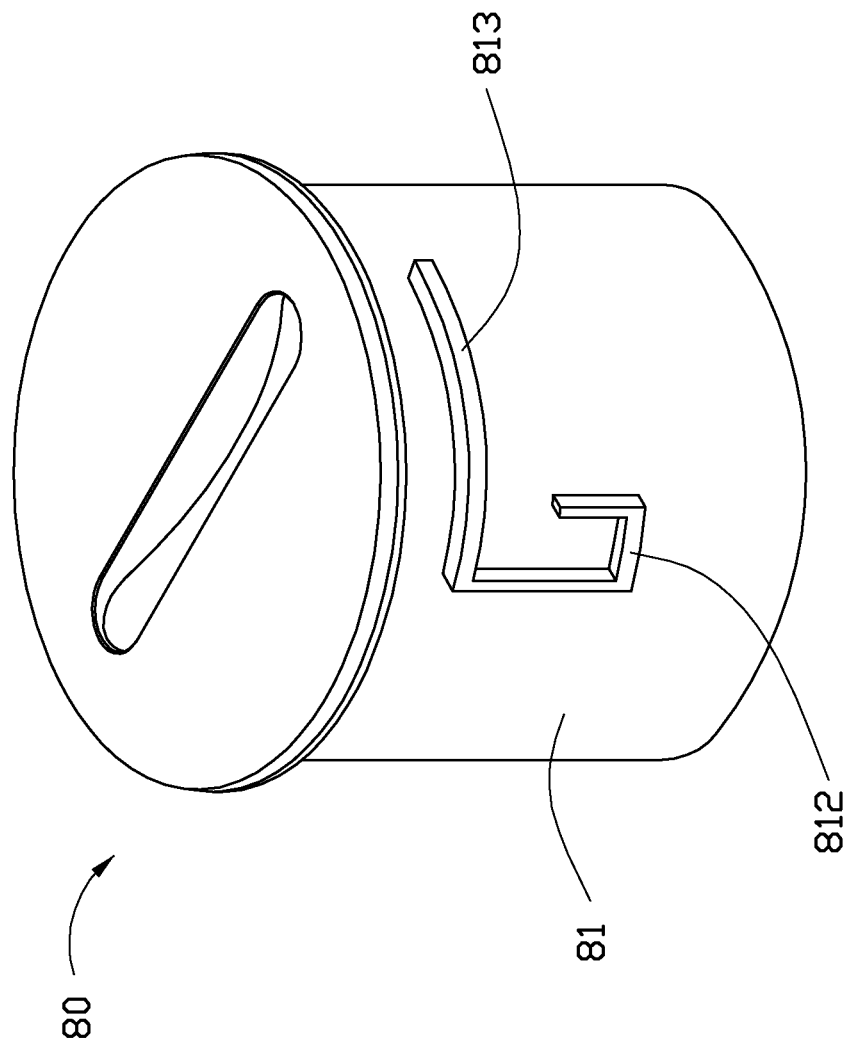
FIG. 8 is an enlarged view of a battery cover of a second embodiment of a fixing mechanism.

Referring to FIG. 8, in a second embodiment, a battery cover 80 includes a latching portion 812 and a guide portion 813. The guide portion 813 may be an elongated protrusion extending from the outer surface of the body portion 81 of the battery sleeve 80 along a circumference substantially perpendicular to the central axis X. The latching portion 812 is substantially C-shaped with one end extending from a part of the guide portion 813. The latching protrusions 15 of the battery sleeve 10 may slide along the guide portion 813 until engaging with the latching portion 812.

It should be noted that the electrically conductive member 40 and the insulated protector 50 can be omitted, in which case the positive electrode 61 of the batteries 60 resists the resilient member 30.

It should also be noted that the configurations of the latching protrusions 15, the guide portions 213, 813, and the latching portions 212, 812 are not limited to the embodiments described above. The numbers and shapes of the latching protrusions 15, the guide portions 213, 813, and the latching portions 212, 812 are specifically described and illustrated for the purpose of exemplifying various aspects of the present fixing mechanism 100 and can vary.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A fixing mechanism, comprising:
a battery sleeve defining an open end to receive a battery, the battery sleeve comprising a latching protrusion formed in an inner surface thereof adjacent to the open end;
a resilient member fixed to the inner surface of the battery sleeve; and
a battery cover comprising a body portion and a cover portion formed at an end of the body portion, the body portion being substantially cylindrical shaped and comprising:
an outer side surface, the outer side surface comprising a curved portion and a flat planar portion connected with the curved portion,
a guide groove defined in the curved portion of the outer side surface, the guide groove comprising a first end defined at an intersection of the curved portion and the flat planar portion and a second end opposite to the first end, and
a latching groove defined in the curved portion of the outer side surface and connecting with the second end of the guide groove;
wherein the battery cover is rotatably engaged with the battery sleeve via the open end, the latching protrusion slides from the flat planar portion to the guide groove until the latching protrusion is locked in the latching groove, and the resilient member presses the battery to resist the battery cover.

2. The fixing mechanism of claim 1, wherein the guide groove is an elongated groove extending along a circumference substantially perpendicular to a central axis of the body portion.

3. The fixing mechanism of claim 1, wherein the flat planar portion is substantially parallel to a central axis of the body portion.

4. The fixing mechanism of claim 1, wherein the battery sleeve further comprises a ledge defined at an inner surface thereof adjacent to the open end, the ledge extending along a circumference substantially perpendicular to a central axis of the battery sleeve to block the cover portion of the battery cover.

5. The fixing mechanism of claim 1, further comprising an electrically conductive member fixed to the resilient member.

6. The fixing mechanism of claim 5, wherein the electrically conductive member comprises a base plate and a contact protrusion protruding from an outer surface of the base plate.

7. The fixing mechanism of claim 5, wherein the electrically conductive member further comprises a plurality of latching protrusions formed at an inner surface thereof; and one end of the resilient member seats the latching protrusions so as to be fixed to the electrically conductive member.

8. The fixing mechanism of claim 6, further comprising an insulated protector fixed to the electrically conductive member.

9. The fixing mechanism of claim 8, wherein the insulated protector comprises a base plate defining a through hole therein; and the contact protrusion passes through the through hole of the insulated protector and contacts the electrode of the battery.

10. The fixing mechanism of claim 1, wherein the battery cover is made of electrically conductive metals.

11. A fixing mechanism, comprising:
a battery sleeve configured to receive a battery and comprising an open end and two latching protrusions formed in an inner surface thereof adjacent to the open end, the two latching protrusions facing each other;
a resilient member fixed to the inner surface of the battery sleeve and located in an end of the battery; and
a battery cover located at the other end of the battery and comprising a body portion and a cover portion formed at an end of the body portion, the body portion being substantially cylindrical shaped and comprising:
an outer side surface, the outer side surface comprising:
two curved portions symmetrically arranged at opposite sides thereof; and
two flat planar portions symmetrically arranged at opposite sides thereof;

the two curved portions and the two flat planar portions being connected end to end;

two guide grooves each being defined in a corresponding curved portion of the outer side surface, each guide groove comprising a first end defined at an intersection of the corresponding curved portion and the adjacent flat planar portion and a second end opposite to the first end; and two latching grooves, each latching groove being defined in the corresponding curved portion of the outer side surface and connecting with the second end of a corresponding one of the guide grooves;

wherein the battery cover is rotatably engaged with the battery sleeve via the open end, and each latching protrusion slides from the flat planar portion into the corresponding guide groove and the corresponding latching groove until the latching protrusion is locked in the latching groove.

12. The fixing mechanism of claim 11, wherein each guide groove is an elongated groove extending along a circumference substantially perpendicular to a central axis of the body portion.

13. The fixing mechanism of claim 11, wherein each flat planar portion is substantially parallel to a central axis of the body portion.

14. The fixing mechanism of claim 11, wherein the battery sleeve further comprises a ledge defined at an inner surface thereof adjacent to the open end, the ledge extending along a circumference substantially perpendicular to a central axis of the battery sleeve to block the cover portion of the battery cover.

15. The fixing mechanism of claim 11, further comprising an electrically conductive member fixed to the resilient member.

16. The fixing mechanism of claim 15, wherein the electrically conductive member is substantially cap-shaped and comprises a base plate, a contact protrusion protruding from an outer surface of the base plate for contacting the battery, and a sidewall which is substantially cylindrical shaped and connected to the base plate.

17. The fixing mechanism of claim 16, wherein the electrically conductive member further comprises a plurality of latching protrusions formed at an inner surface of the sidewall; and one end of the resilient member seats the latching protrusions so as to be fixed to the electrically conductive member.

18. The fixing mechanism of claim 16, further comprising an insulated protector fixed to the electrically conductive member, wherein the insulated protector comprises a base plate defining a through hole therein, and the contact protrusion passes through the through hole of the insulated protector and contacts the electrode of the battery.

* * * * *